UNITED STATES PATENT OFFICE.

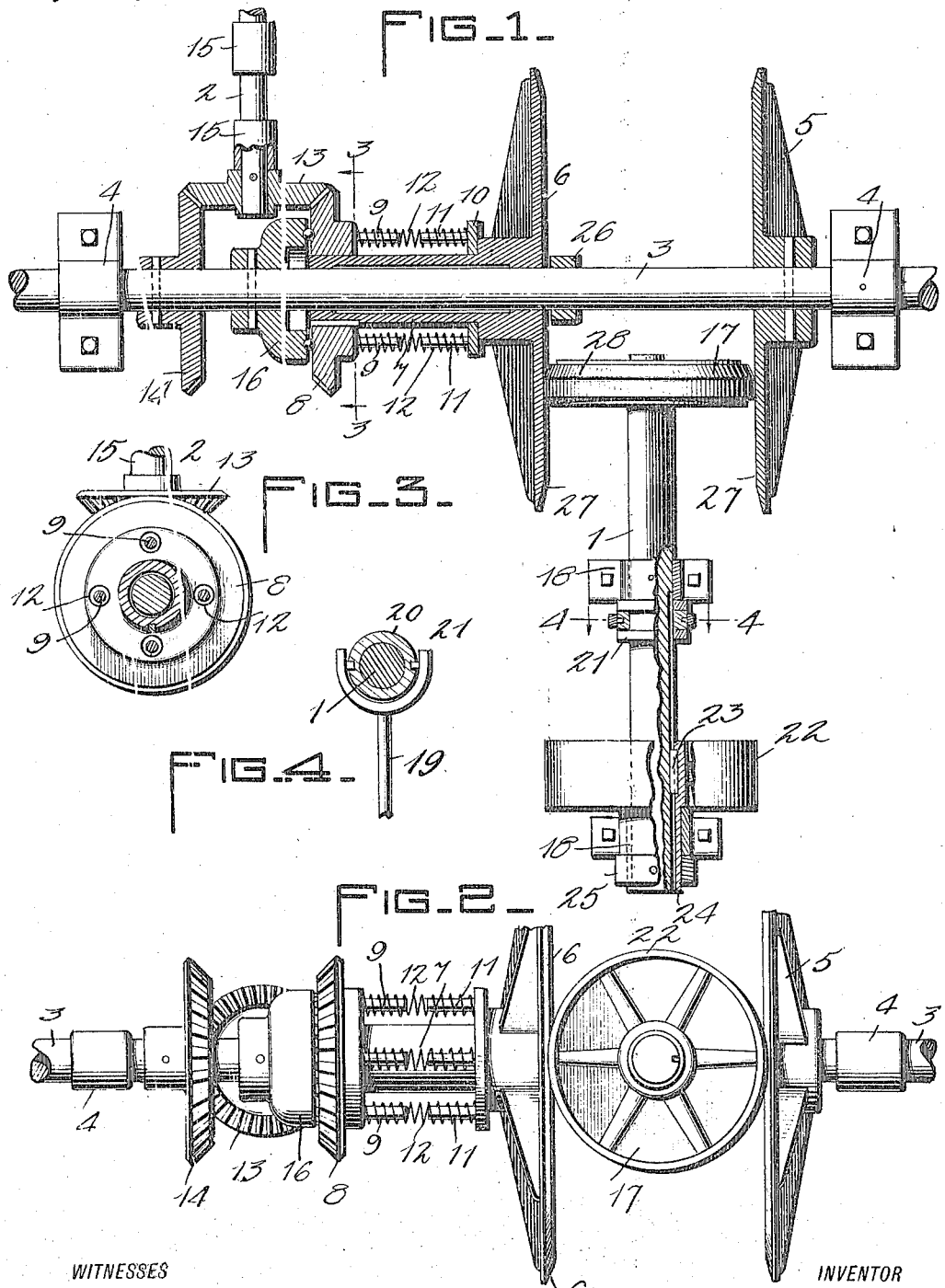

RALPH DOUGLASS GEORGE, OF KANSAS CITY, MISSOURI.

FRICTION-GEARING.

1,234,007.

Specification of Letters Patent. Patented July 17, 1917.

Application filed September 9, 1916. Serial No. 119,232.

*To all whom it may concern:*

Be it known that I, RALPH D. GEORGE, a citizen of the United States, and a resident of Kansas City, in the county of Jackson and State of Missouri, have invented an Improvement in Friction-Gearing, of which the following is a specification.

My invention is an improvement in gearless transmissions, and has for its object to provide a transmission of the character specified, wherein a transmission shaft is arranged between the driving and the driven shafts, the said transmission having a fixed and a movable disk, which is spring pressed toward the fixed disk, and the driving shaft having a wheel engaging between the two disks and movable toward and from the transmission shaft to vary the relative speed of the said shafts, and wherein the driven shaft is connected with both disks and on opposite sides of the said shaft to counterbalance the thrust thereon.

In the drawings:

Figure 1 is a longitudinal section.

Fig. 2 is a side view of the transmission.

Figs. 3 and 4 are sections on the lines 3—3 and 4—4, respectively, of Fig. 1, each view looking in the direction of the arrows adjacent to the lines.

In the present embodiment of the invention the driving shaft 1 is arranged parallel with the driven shaft 2 but in offset relation, and a transmission shaft 3 is arranged between the said shafts and at right angles thereto. The transmission shaft is journaled in bearings 4, and a friction disk 5 is pinned to the transmission shaft near one of the bearings. A second friction disk 6 is mounted loosely on the transmission shaft, the said disk having an elongated hub 7, upon which is feathered a gear wheel 8, at the end remote from the disk. The disk 6 may be moved with respect to the gear wheel 8, but the gear wheel is constrained to rotate with the disk by means of the key or feather arranged between the said gear wheel and the hub of the disk. The gear wheel has pins 9 extending longitudinally of the shaft, and a washer 10 is mounted upon the hub at the disk, the said washer having similar pins 11 registering with the pins 9.

Coil springs 12 encircle the registering pins, and these springs normally act to force the disk 6 and the hub 7 toward the disk 5.

The gear wheel 8 engages a gear wheel 13 on the driven shaft 2, and opposite the gear wheel 8 the gear wheel 13 is engaged by a second gear wheel 14, which is pinned to the shaft 3. Thus the thrust of the gear wheel 8 on the gear wheel 13 is counterbalanced and compensated for by the gear wheel 14. The gear wheels 8, 13, and 14 are bevel gears, as shown, and the driven shaft is journaled in suitable bearings 15.

The thrust of the gear wheel 8 toward the shaft 2 is resisted by a stop in the form of a cup shape member 16 which is pinned to the shaft 3 between the gear wheels 8 and 14, and a ball bearing is arranged between the abutting faces of the gear wheel 8 and the collar 16. The driving shaft 1 is provided with a friction wheel 17 between the disks 5 and 6, for engaging the said disks, and the shaft is mounted to rotate and to slide longitudinally in bearings 18.

Means is provided for moving the shaft longitudinally, the said means comprising a lever 19 provided with a fork whose arms have inwardly extending pins engaging a ring 20 arranged in an annular groove in a collar 21 keyed to the shaft. By means of the lever the wheel 17 may be moved radially of the shaft 3, to connect the shafts 1 and 3 at varying speeds.

The power is transmitted to the shaft 1, in the present instance, by means of a suitable belt engaging a pulley 22. This pulley is feathered on the shaft 1, as indicated at 23, in such manner that while the shaft 1 may move longitudinally with respect to the pulley it must rotate therewith. The pulley has an extended hub 24 which passes through the adjacent bearing 18, and a stop collar 25 is mounted on this extended hub on the outer side of the bearing 18, the stop collar acting to hold the pulley in fixed position.

In operation, power being transmitted to the shaft 1 by means of the pulley 22, the disks 5 and 6 will be turned in opposite directions, turning the shaft 3 and the hub 7 also in opposite directions. The movement of the disk 6 is transmitted to the gear wheel 8 and the movement of the disk 5 is transmitted to the gear wheel 14, and these gear wheels engaging opposite sides of the gear wheel 13 and rotating in opposite directions will rotate the gear wheel 13 and the shaft 2.

When it is desired to change the relative speed of the shafts 1 and 2, the shaft 1 is moved toward or from the shaft 3, and it will be evident that as the wheel 17 nears the center of the disks 5 and 6 the speed of the shaft 3 will be increased, while when the said wheel nears the peripheries of the disks the speed of the shaft 3 will be decreased. In the first instance there will be a decrease of the torque, while in the last there will be an increase of torque.

When it is desired to disconnect the shafts 1 and 2, the shaft 1 is moved away from the shaft 3, until the wheel 17 disengages or releases the disks 5 and 6. In order to permit the easy engagement of the wheel 17 between the disks 5 and 6 after it has been withdrawn, means is provided for limiting the movement of the disk 6 under the influence of the springs 12 toward the disk 5. The said means is a stop collar 26 secured to the shaft 3 at a point such that when the wheel 17 is away from between the disks 5 and 6 the disk 6 will engage the said stop and the stop will hold the disk in such position that the wheel 17 may be reëntered between the disks without striking the edge of either disk. To facilitate this movement, it will be noticed that the inner or operative faces of the disks 5 and 6 are beveled at their peripheries, as indicated at 27, and that that face of the wheel 17 adjacent to the shaft 3 is also beveled, as shown at 28.

I claim:

1. In combination, concentric members, means for imparting a variable rotation to said members in reverse directions, a driven member, gearing between the driven member and one of the said concentric members, a gear element in mesh with the said gearing, yieldable means between the gear element and the remaining concentric member normally exerting a pressure to force them apart.

2. In combination, concentric members, means for imparting a variable rotation to said members in reverse directions, a driven member, gearing between the driven member and one of the said concentric members, a gear element in mesh with the said gearing, yieldable means between the gear element and the remaining concentric member normally exerting a pressure to force them apart, and stop means for limiting the outward movements of the yieldably-pressed-apart gear element and concentric member.

3. In combination, a transmission shaft, a friction disk secured to said shaft, a second friction disk loosely mounted upon the transmission shaft and movable longitudinally thereon, means for imparting a variable rotation to the friction disks in reverse directions, a gear element rotatable with the said second friction disk and having a relative movement toward and away therefrom, yieldable means between the gear element and second friction disk normally pressing them apart, a driven member geared to the said gear element, and gear connecting means between the driven member and the transmission shaft.

4. In combination, a transmission shaft, a friction disk secured to said shaft, a second friction disk loose upon the transmission shaft, means for rotating the friction disks in reverse directions at variable speeds, a gear element having a splined connection with the said second friction disk, yieldable means normally pressing the gear element and second friction disk apart, means secured to the transmission shaft for limiting the outward movements of the gear element and second friction disk, a driven member, a second gear element secured to the driven member, and in mesh with the before-mentioned gear element, and a third gear element secured to the transmission shaft and in mesh with the said second gear element.

RALPH DOUGLASS GEORGE.

Copies of this patent may be obtained for five cents each, by addressing the "Commissioner of Patents, Washington, D. C."